United States Patent [19]
Constant

[11] 3,965,342
[45] June 22, 1976

[54] DIGITAL FFT PROCESSOR USING RANDOM ACCESS MEMORY

[76] Inventor: James Nickolas Constant, 1603 Danbury Drive, Claremont, Calif. 91711

[22] Filed: Nov. 4, 1974

[21] Appl. No.: 520,748

[52] U.S. Cl.............................. 235/156; 307/208; 328/55
[51] Int. Cl.[2].......................................... G06F 7/38
[58] Field of Search ............ 235/156; 307/208, 266; 328/55, 58; 445/1

[56] References Cited
UNITED STATES PATENTS
3,541,458  11/1970  Klund ............................ 235/156 X OTHER PUBLICATIONS
Bergland, G. D., *A Fast Fourier Transform Algorithm for Real-Valued Series*, In Comm. ACM 11(10): Oct. 1968, pp. 703–710.

*Primary Examiner*—R. Stephen Dildine, Jr.
*Attorney, Agent, or Firm*—Harris, Kern, Wallen & Tinsley

[57] ABSTRACT

A system for digital signal processing including a random access memory accessed by counters and used for storing and shifting signals in a fast Fourier transformer (FFT).

22 Claims, 5 Drawing Figures

DIGITAL FFT PROCESSOR USING RANDOM ACCESS MEMORY

BACKGROUND OF THE INVENTION

The present invention relates to signal processing using time compressors, fast Fourier transformers, and more particularly to digital signal processing in which signals are represented by a series of coded digits, for example digits found at the output of an analog-to-digital converter.

The linear and bilinear operations most needed for signal processing are: matched filtering, cross correlation, and the discrete Fourier transform (DFT). These transforms represent an excessive computational load for a general purpose computer and a heavy load even for a digital computer structured for signal processing. For example, a straightforward linear transformation in a computer that takes a sequence of N data points into a sequence of N transform points may be regarded as a multiplication by a vector $N^2$ matrix. A direct implementation of the DFT, as example, requires $N^2$ multiplication times and $N^2$ words of storage. The fast Fourier transform (FFT) obtains the same result with $Nlog_2N$ multiplications and $Nlog_2N$ words of storage. This can all be seen in a number of publications including the book by Gold and Rader "Digital Processing of Signals" McGraw-Hill 1969 and in the book edited by Rabiner Rader "Digital Signal Processing" IEEE Press. 1972 and in the paper by Bergland, "A Fast Fourier Transform Algorithm for Real-Valued Series," appearing in the October, 1968 issue of Communication of the ACM.

In the present art the computation of the DFT via the FFT in a general purpose computer having an execution time of 1 millisecond/operation is $Nlog_2N$ milliseconds and this becomes quite large even for modest values of N. Cascading, paralleling, and arraying computers quickly increases the cost. As a consequence, while the general purpose computer has the potential for computing the DFT it falls short in many applications which require real time operation. Special purpose hardware on the other hand is known in the present art having execution times on the order of 1 microsecond/operation and these are indicated for many applications where the DFT processing must be accomplished in real time. FFT hardware has been discussed in the article by Bergland "FFT Transform Hardware Implementations — An Overview" appearing in the June, 1969 issue of IEEE Transactions on Audio and Electro-acoustics, and in the article by Groginsky and Works "A Pipeline Fast Fourier Transform" appearing in the November, 1970 issue of IEEE Transactions on Computers. FFT processors may be implemented using any one of a number of technologies and these have been discussed in a number of publications including the paper by Whitehouse et al. "High Speed Serial Access Linear Transform Implementations" Naval Undersea Center, San Diego, CA 92132 January, 1973. In general, apparatus fall into two broad categories; those employing acoustic means and non-acoustic means. Included in the former category are sonic, magnetostrictive, acoustic surface wave, and opto-acoustic filters, while the latter category comprises charge coupled devices (CCD), and binary shift registers (BSR). Acoustic filters have been described in the paper by Squire et al. "Linear Signal Processing and Ultrasonic Transversal Filters" appearing in the November, 1969 issue of IEEE Transactions on Microwave Theory and Techniques, and in the paper by Holland and Claiborne "Practical Acoustic Wave Devices" appearing in the May, 1974 issue of IEEE Proceedings, while non-acoustic filters have been described in the paper by Byram et al. "Signal Processing Device Technology" appearing in the Proceedings of the NATO Advanced Study Institute on Signal Processing held at the University of Technology, Loughborough, U. K. on Aug. 21 through Sept. 1, 1972, and in the papers by Kosnocky, and Buss et al. appearing in Tecnical Session 2 "Introduction to Charge Coupled Devices" 1974 WESCON, Los Angles, Sept. 10 through 13, 1974.

As a rule, if interruptions of the processing are infrequent then acoustic filters are preferred since they offer large storage capacity, convenient tapping of delay lines, and lower power dissipation. When short-duration interruptions of the signal processing may occur then CCD with their controllable clock rates offer the advantages of small size, offset only by charge transfer inefficiency and temperature sensitivity. When frequent processing interrupts are required then digital implementations in the form of shift registers are indicated. The rapid development however of solid state technology favors digital devices and these by far have now become the preferred devices for implementing signal processors.

Digital implementations of the present art have been obtained in the form of shift registers, BSR, CCD and so forth. Such devices can be assembled from conventional medium scale integrated (MSI) circuit logic or can be designed in large scale integrated (LSI) form. Thus, the digital implementation of a FFT processor requires the high speed storage and readout of data in a number of shift registers. However, shift registers are limited in length and speed, and many similar devices are needed if much data is to be stored. Metal-oxide (MOS) registers while providing high density are slow speed when used as bipolar shift registers.

In many signal processing applications the signals must be compressed in time. This is accomplished in the prior art by storing signals in a delay line and then retrieving them at a rate which is greater than the rate of storage, as explained in the article by Squire. Of particular interest is the delay time compressor (DELTIC) which recirculates in a number of recirculations. The recirculation requires less length of delay line and therefore is a more efficient system. The DELTIC circuit has been used for implementing digital time compressors, matched filters, and correlators and this can be seen in my copending applications Ser. Nos. 450,606 filed Mar. 13, 1974 and 479,872 filed June 17, 1974.

In general, the prior digital art using shift registers utilize 3N/2 words of storage and N multipliers at a given section in the computation of the DFT via the FFT. While the system of the present invention may also utilize 3N/2 words of storage per section its implementation using RAM and a digital DELTIC loop requires but a single multiplier per section and in this manner provides new and improved FFT processors while sugnificantly decreasing the weight, size, power consumption, and cost for such devices.

From the discussion above it is clear that in the past, the digital implementation of a FFT processor using special purpose hardware has been accomplished utilizing shift registers in the memory elements and, for all practical purposes, has not been successful for inceasing the capacity and speed of operation of such devices beyond a certain limit determined by the technology of shift registers. Furthermore, the present art of digital implementations falls short when the size and cost of shift registers are considered in devices requiring high throughputs.

It is the purpose of the present invention to produce a FFT processor capable of exceeding the practical capacity and speed of present digital devices by at least one order of magnitude, at reduced size and cost.

SUMMARY OF THE INVENTION

This invention provides both apparatus and method for the digital implementation of FFT processors. A random access memory (RAM) accessed sequentially by a counter is utilized to perform the function of a delay line in a preferred configuration.

The general purpose of this invention is to provide small-size low-cost apparatus for the digital implementation of high-capacity high-speed FFT processors. Utilizing the system of the present invention, the digital processing of signals may be accomplished efficiently and economically in real time.

Particular objectives of the invention are to provide a number of configurations of the system preferably using a RAM in a DELTIC loop circuit and thereby to provide new and improved FFT processors.

DESCRIPTION OF THE PREFERRED EMBODIMENT

Figure 1:
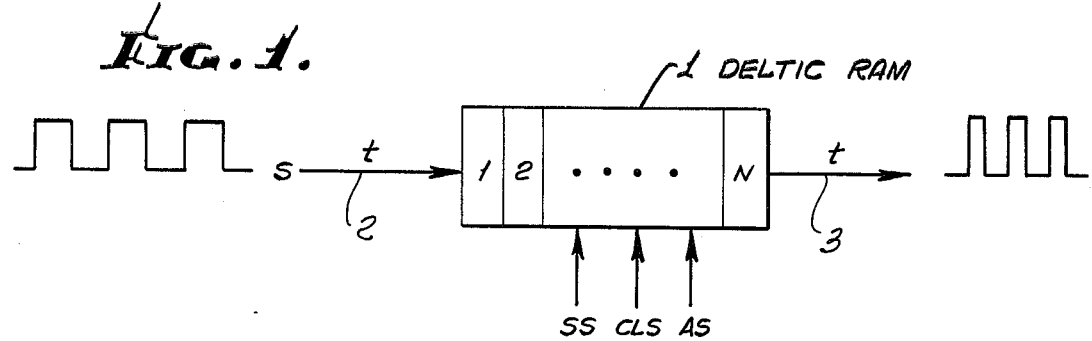
FIG. 1 is a modified DELTIC circuit loop utilized to compress signals in time.
Figure 2:
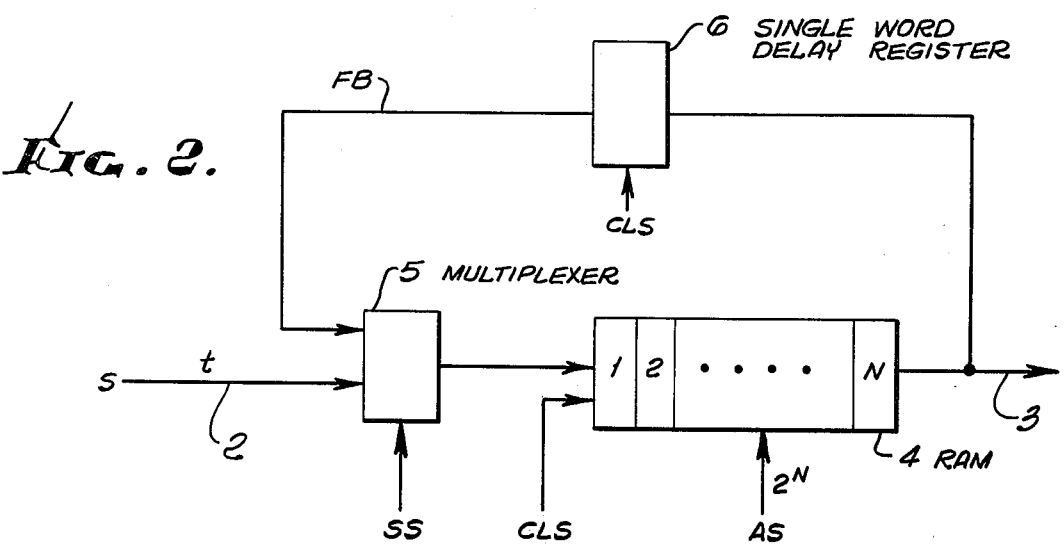
FIG. 2 is a more detailed block diagram of FIG. 1.

Referring to FIG. 1, a modified DELTIC circuit loop 1 is utilized to compress signals S in time under control of sampling SS, clock CL, and address AS signals. A signal S appears on $t$ lines at input 2 and is compressed in time appearing on $t$ lines at output 3. The modified DELTIC loop 1 is shown in FIG. 2 in more detail. The modification consists of replacing the computer type acoustic delay line memory usually associated with a conventional DELTIC loop by a random access memory (RAM) 4. In the present disclosure I will refer to the modified DELTIC loop as a DELTIC RAM, DELTIC ROM, and so forth to better indicate the present apparatus over the conventional art. The conventional DELTIC loop is described in the paper by Rosenbloom "Using Time Compression Techniques in Digital Correlation" appearing in the Mar. 10, 1961 issue of Electronics, and in the paper by Anderson "The Deltic Correlator" appearing in Technical Memo 37, Acoustic Research Laboratory, Harvard University, Cambridge, Mass., Jan. 1965.

Referring to FIG. 2, an analog signal which has, for example, been digitized to $t$ level, where $t = 1, 2, \ldots$, appears on $t$ lines as signal S at 2 and is gated through multiplexer 5 to RAM 4. Thus multiplexer 5 when commanded by sampling signal SS inserts signal S into RAM 4 which normally receives feedback signal FB on each clock signal CLS. It will be recognized that the procedure of FIG. 2 follows the operation of a conventional DELTIC loop in which RAM 4 plays the role of a delay line. Typically, for certain selections of RAM 4, when clock CLS is LOW, write enable lines in RAM 4 are enabled and signal S in the form of a $t$ bit word is written into the selected location of RAM 4. When the clock CLS goes HIGH, an address counter increments selecting the next address AS which appears on $2^N$ lines. The $t$ line outputs at 3 are fed back to the inputs of RAM 4 as feedback signal FB through single word delay register 6 and multiplexer 5 which inhibits signal FB only when signal S is being sampled. The signal which appears at the output 3 of RAM 4 is a time compressed replica of signal S. Reference signal W may also be compressed in time in a similar fashion.

Figure 3:
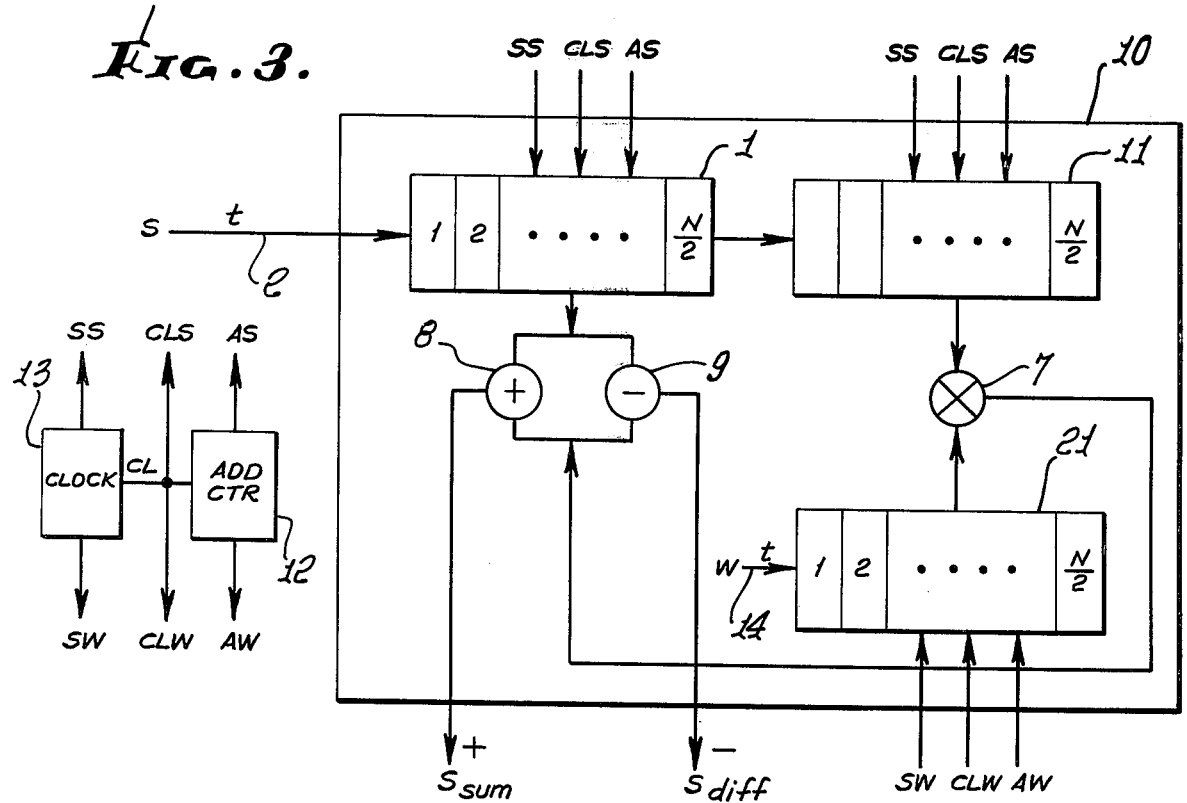
FIG. 3 is a block diagram of an element which recurs in the implementation of the FFT processor.

Referring to FIG. 3, RAMs 1 and 11 are arranged to store N samples of signal S. RAM 1 stores the N/2 most recent while RAM 11 stores the N/2 least recent samples of signal S. RAM 21 is used to store reference or rotation vector signal W in time. RAMs 1 and 11 may be in the form of simple RAMs or DELTIC RAMs while RAM 21 may be in any one of a number of forms including a shift register, charge coupled device (CCD), RAM, DELTIC RAM, a read-only memory (ROM), programmable read-only memory (PROM), or simply a set of bipolar signals or voltages applied to one input of multiplier 7, the other input to multiplier 7 being provided by RAM 11. Thus RAMs 1, 11, 21 may be any one of a number of types, the exact type being determined by the application. RAMs 1 and 11 are organized N/2 words by $t$ bits and are arranged to operate as serial-in serial-out shift registers. An example of the use of a RAM as a shift register is given in the brief article by Springer "Higher Speed Shift Registers use TTL RAMs and Counters do all the Shifting" appearing on page 146 of the Sept. 1, 1973 issue of Electronic Design. In the following RAMs 1, 11, and 21 will be assumed to be DELTIC RAMs although their exact specification will be determined by the application. With this assumption, RAMs 1, 11, and 21 are accessed by address counter 12. On each clock CL, address counter 12 shifts one place thus selecting a different word in DELTIC RAMs 1, 11, and 21. The address cycle is completed after N/2 shifts and is under control of the computer or clock 13 which also provides timing and sampling by way of clock signals CLS, CLW, and sampling signals SS, SW. An analog signal which has previously been digitized to $t$ level at the rate SS appears on $t$ lines as signal S at 2 while a second signal appears on $t$ lines as rotation vector signal W at 14. The clock, sampling, and address signals CLS, CLW, SS, SW, AS, AW are determined by the application. Clock signals CLS and CLW are determined by the system capacity and speed. Sampling signals SS and SW may be some frequency fraction of the clock rate CL and generally are determined by sampling requirements for signal S and rotation vector W. Finally address signals As and AW are determined by the size of RAMs in DELTIC RAMs 1, 11, and 21.

Using some RAMs, for example the SN 7489, AM 27503, 310 IT, $\mu$A 9103, NA 7599, and so forth, the operation proceeds in a manner such that when clock CL is LOW, write enable lines in the RAMs are enabled by clock signal CLS and the digitized signal S is written into the selected location of DELTIC RAMe 1 and 11. When the clock CL goes HIGH, address counter 12 increments selecting the next address while DELTIC RAMs 1 and 11 go into the READ mode. Other RAMs, for example the Signetics Model 82S21, will accept signals S while their contents are being read. Thus, on each shift of address counter 12, the information stored in DELTIC RAM 1 is supplied to sum and difference circuits 8 and 9 while the information stored in DELTIC RAM 11 is supplied to multiplier 7 which may be in the form of a half adder (exclusive OR gate) or full adder which then multiplies the signal with the rotation vector W provided by DELTIC RAM 21 to produce the product of signals S and W for that place. The product of signals S and W from multiplier 7 is then applied to sum and difference circuits 8 and 9 which then provide the sum and difference signals $S_{sum} = S_n + S_{n+N/2} W_{n+N/2}$ and $S_{diff} = S_n - S_{n+N/2} W_{n+N/2}$ where $N = 1, 2, \ldots, N/2$ is the particular address for which the sum and difference signals are obtained. Unlike the corresponding shift register implementation as tapped delay lines in the prior art, the preferable system of the present invention implements each element of the FFT processor as a tri-RAM (DELTIC or non-DELTIC) circuit. Thus while the invention in a preferable configuration employs a DELTIC RAM, it will operate equally well using a RAM. It will be recognized by those in the art that the present invention implements each element of the FFT processor using RAMs in the role of delay registers. The theory and properties of conventional implementations of delay lines as transversal filters have been described in the reference by Squire et al., and Holland and Claiborne, while digital implementations as transversal filters are described in the reference by Whitehouse et al., Byran et al., Kosonocky, Buss et al., and in my copending applications Ser. No. 450,606 and 479,872. In summary, the present invention implements FFT processors using RAMs.

Once loaded into their respective DELTIC RAMs 1, 11, and 21 signals S and W may be multiplied at the clock rate CL in multiplier 7 to produce the product SW which when added and subtracted from the output of DELTIC RAM 1 in sum and difference circuits 8 and 9 provide the sum and difference signals $S_{sum}$ and $S_{diff}$. It should be understood in FIG. 3 that the operation of DELTIC RAMs 1 and 11 and DELTIC RAM 21 is not necessarily identical, the difference being that while DELTIC RAMs 1, 11 continuously update signal S by delaying signals in their respective single word delay registers 6 and multiplexers 5, no such delaying and multiplexing are required in DELTIC RAM 21 when this circuit is being used as a fixed reference. Thus, the single word delay register 6 and multiplexer 5 required for operation as a DELTIC RAM are not needed once reference signal W has been loaded into DELTIC RAM 21 for use as a fixed reference. Also it should be understood that all operations involving complex arithmetic are carried out in parallel, for example as shown by Whitehouse et al.

It should be understood that address codes AS and AW are applied to DELTIC RAMs 1, 11, 21 on $2^{N/2}$ lines. It should also be understood that signal S and rotation vector W are applied on t lines to their respective DELTIC RAMs 1, 11, 21 the outputs of which are also carried on t lines.

The system of the present invention can be operated as either a fixed or programmable FFT processor. When used as a fixed processor, the desired rotation vector W is loaded into RAM 21 which may be in the form of a DELTIC or non-DELTIC RAM, a ROM, PROM, and left undisturbed for the duration of the required processing. However, the system of the present invention is particularly suited for applications in which the rotation vector W must frequently be changed. The change is made by loading a new rotation vector W into DELTIC RAM 21 and as before, introducing signal S which is to be processed into DELTIC RAMs 1, and 11, the entire operation being under control of clock 13. In this mode of its operation the present invention constitutes a programmable FFT processor. In practical terms, the difference between a fixed and programmable processor is in the way the rotation vector W is implemented for processing signal S. If W is built into the system it becomes a fixed processor while if W is applied as desired to the system it becomes a programmable processor.

In mathematical terms, the discrete Fourier transform (DFT) is described by the equation $$F_p = \sum_{n=1}^{N} S_n W^{pn} \qquad (1)$$

where $$W = e^{-j2\pi/N}$$

and $S_n$ is a complex data sample, and $F_p$ is the complex spectral element of $S_n$ at the frequency p.

Figure 4:
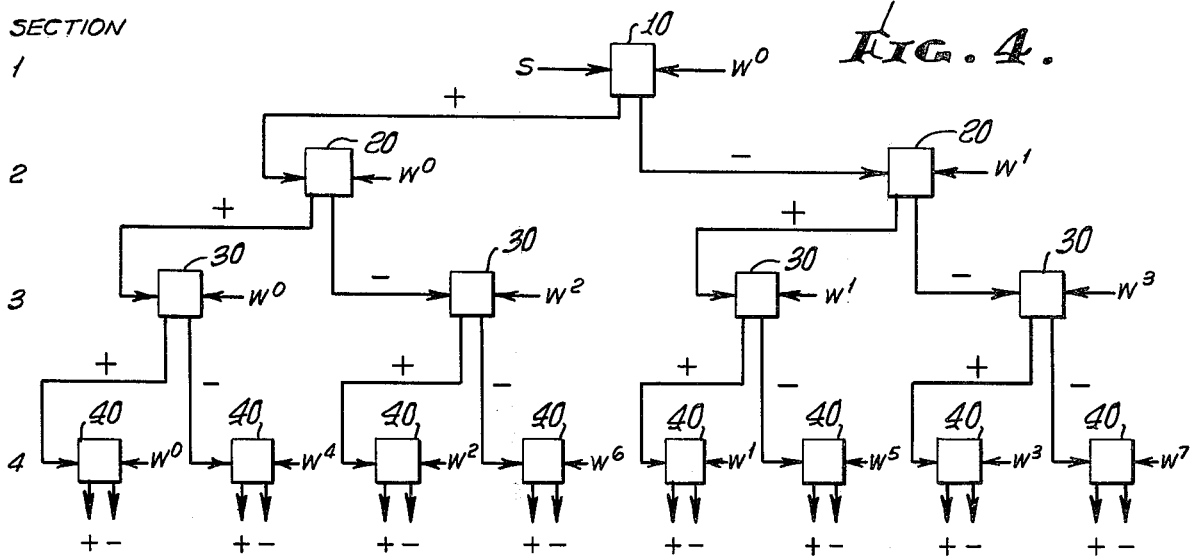
FIG. 4 is a block diagram of a plurality of elements in a FFT processor.

The hardware implementation of this equation via the FFT is shown in the block diagram of FIG. 4. Shown in the figure are the first four tiers or sections of the FFT processor according to the architecture which is peculiar to this algorithm. The first section comprises element 10 with N words (of signal S), the second section comprises elements 20 each with N/2 words (of sum or difference signals $S_{sum}, S_{diff}$), the third section comprises elements 30 each with N/4 words, and so forth. Signal S and rotation vector $W^0$ are inputted to element 10 and the sum and difference signals $S_{sum}, S_{diff}$ (denoted by + and − in the figure) are inputted to elements in the second section. Elements 20 also receive their rotation vectors as shown and in turn provide their outputs to elements 30 in the third section. In this manner signal S is processed in a series of sections $m = \log_2 N$ in the well known scheme of the FFT algorithm. In particular, while elements 10, 20, 30, ..., may be identical in architecture, they may differ in detail. Thus while element 10 may be implemented using DELTIC RAMs, the remaining elements may be implemented using RAMs. Of course, the word content of elements in the succeeding sections decreases but the total words in a section is N. Eventually, the output section produces the spectral components $F_p$. The individual elements 10, 20, 30, ...., are all accessed by address counter 12 and are under control of clock 13.

Figure 5:
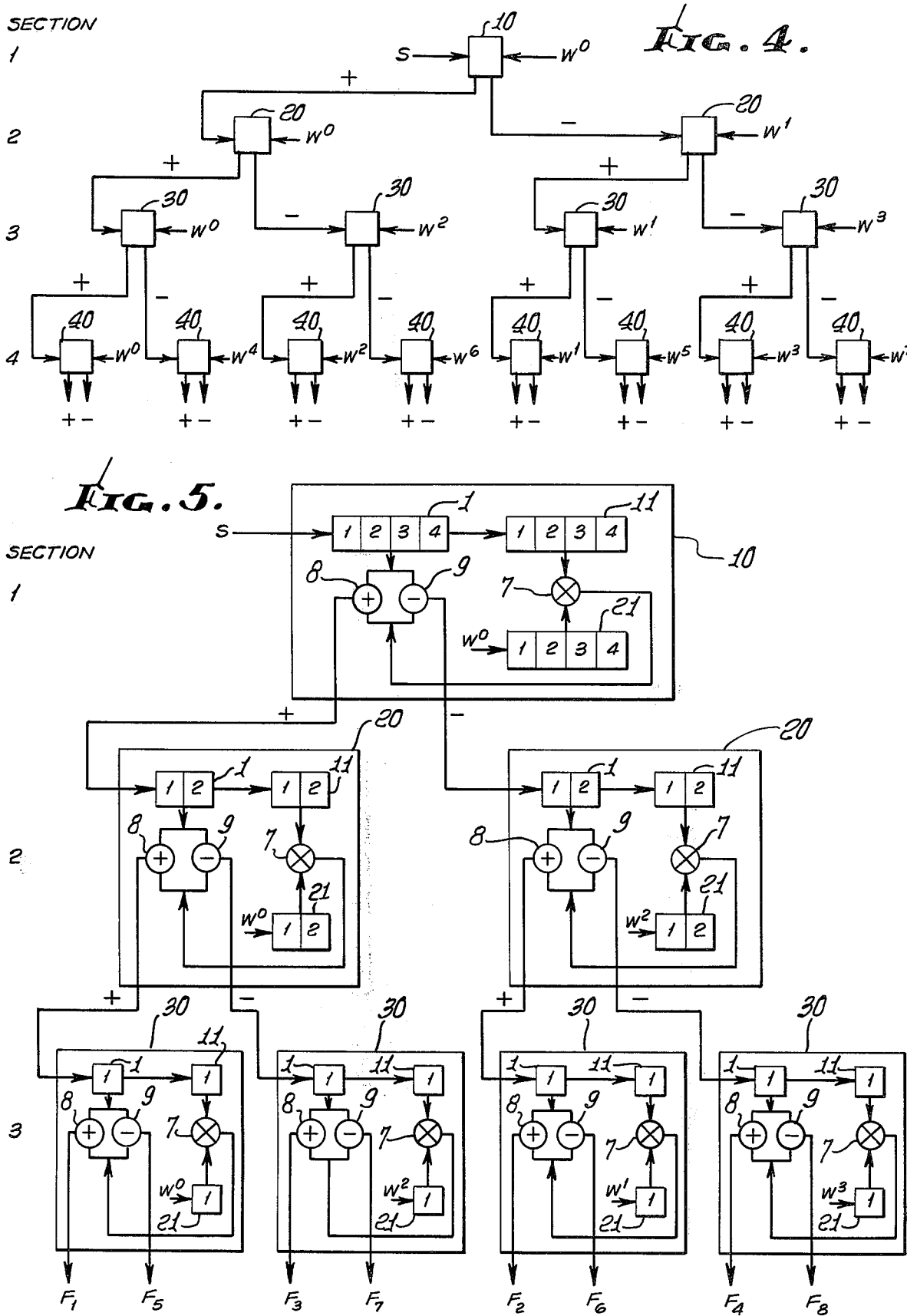
FIG. 5 is a detailed block diagram of the system for N=8 words.

FIG. 5 shows a digital FFT processor in accordance with the system of the present invention. The processor has $m = 3$ sections; section 1 has one element 10, section 2 has two elements 20, and section 3 has four elements 40. Each element receives as input its appropriate rotation vector $W^z$ as shown and each operates in the manner described in connection with the discussion of element 10 in FIG. 3. As shown in the figure each element has an identical architecture except for the number of words in its memory which of course is determined by its location in the system; element 10 has 8 words, elements 20 each have 4 words, and elements 30 each have 2 words. The total number of words in a given section is 8. Apart from the word content of each element the elements operate in an identical manner and are accessed by address counter 12 and synchronized by clock 13. In each element the most recent N/2 samples of input signals are stored in RAM 1 while the least recent N/2 samples are stored in RAM 11. On each updata of input signal S the least recent N/2 samples in RAM 11 are multiplied with the values of their appropriate rotation vector $W^z$ from RAM 21 and the products are inputted to sum and difference circuits 8 and 9 which also receive as inputs the N/2 most recent samples from RAM 1 with result the sum and difference signals appearing at the output of each element in a given section and these are applied to corresponding elements in the next section. The procedure is well known in the FFT art, for example see the articles by Bergland, and Groginsky and Works. The result at the output of section 3 is the frequency spectrum $F_p$ with $p = 1, 2, \ldots, 8$. in the usual scrambled order associated with the FFT algorithm. In particular, it should be understood that on each update or sample of signal S the word contents of elements in each section of the processor are cycled through by clock 13 and address counter 12 and as a consequence the spectral components $F_p$ at the output of the processor appear at the cycle rate. Thus, N = 8 samples of signal S stored in DELTIC RAMs 1 and 11 produces P = 8 samples of the frequency spectrum $F_p$ at the output of the sum and difference circuits 8 and 9 in elements 30 of section 3 and the output F changes with each update or sample of S. Although shown as a system having N = 8, the system of FIG. 5 can be extended to process any general number N of samples of signal S.

Any one of the many possible modes of operation suggested by FIG. 5 produces the frequency spectrum F of signal S at the output of the processor. In particular, the total number of operations required is $N\log_2 N$ and these can be performed serially, in cascade, in parallel, or in array, as suggested by Bergland the particular system given by way of example in FIG. 5 being a cascade of sections. When the address counter 12 has gone through its full N/2 word count cycle on each update or sample of signal S, the same RAM 1, 11, 21 locations will be addressed again, and the data stored during the last access of that location will be read out. While conventional FFT processors employ 1 × N/2 shift register, the system of the present invention utilizes the $t \times N/2$ memory system of a RAM to obtain further capacity, speed, size, and cost improvements over the present art. As is the case with shift registers, RAMs also can be assembled from readily available MSI circuit logic or can be specially designed in LSI form. In MSI form both types of devices are limited in size and many units are needed if large N word and $t$ bit capacities are to be achieved. However, unlike a shift register, the "length" of a RAM is less speed dependent while its content is under control of clock 13 signal CL, sampling SS, and address signal AS, thus offering a wide variety of combinations for these parameters. On a per bit basis, the size and cost of a RAM is considerably less than that for a shift register. For example, the SN 7489 64 bit TTL RAM costs 25% more than the SN 74164 8 bit TTL shift register. Both these devices have the same size so the conclusion is that eight times more capacity can be achieved by using a typical commercially available RAM over a shift register at only slight increase in cost. On the other hand, present RAM speeds at 100 MHz now exceed shift register speeds by a factor 10. It is to be expected therefore that the FFT processor system of the present invention will increase both the capacity and speed of such devices while decreasing their size and cost by an order of magnitude. As example of the efficiency of the system of the present invention, a system for N = 512 requires a total word capacity of $N\log_2 N$ words and for an input quantization of $t = 8$ bits this can be obtained easily using 10 4K RAM chips each the size of a thumb. This then is the objective of the present invention.

The distinguishing feature of the present invention is the preferred use of a RAM (in a DELTIC or non-DELTIC) circuit to perform the function of a delay line for the implementation of a FFT processor. Thus while a clock 13 may be used to provide sampling SS, SW and clock cignals CLS, CLW using shift registers in the prior art, the use of a RAM in the present invention also requires the use of an address counter 12 for addressing RAMs 1, 11, 21. Under control of the clock signal CL, address counter 12 steps though address sequence 1, 2, . . . , N/2. At each location the clock signal CLS, or CLW, applied to a memory moves signals, first, from the memory to its output and, second, from its input to the location in the memory being addressed. The clock signal therefore controls accessing to and from the memory and, through address counter 12, addressing the memory. It also controls updating or sampling the signals S and W with signals SS and SW which are used to gate signals from the outside world to each element of the system.

As shown in FIG. 3, the input signals which have been digitized to t bits are inputted to a given memory on $t$ lines and outputted on $t$ lines. The two $t$ line outputs of RAMs 11, and 21 are multiplied in multiplier 7 which in practical terms may assume the form of $t$ adders or $t$ exclusive OR gates. The output of multiplier 7 is carried on $t$ lines and is inputted to sum and difference circuits 8 and 9 which also receive the output of RAM 1 on $t$ lines. The output of sum and difference circuits 8 and 9 is also carried on $t$ lines. Thus on the positive portion of the clock cycle, the $t$ bit signal contained in a memory is outputted from the memory while on the negative cycle, new information at the memory input is written into the memory. "Accessing" the memory calls for, first, moving its present content to its output and, second, moving new information into the just vacated location of that particular address in the memory. The input signal S occurs at the sampling rate SS while the clock, in some applications may be at the faster rate CLS (particularly when implementing the DELTIC RAM circuit). All timing signals SS, SW, CLS, CLW, AS, AW are under control of clock 13, their exact specification and selection being determined by the application. The clock and its signal CL therefore controls sampling, addressing, and accessing. "Timing" is the sequence which is used in a particular application to perform the needed tasks and operations In many applications In many applications it is desirable to combine the central control afforded by a general purpose computer with the efficiency and economy provided by special purpose signal processing devices. Such applications might require operations which include matched filtering for echo ranging or for coherent communications systems, cross correlation for interferometric analysis or for signal identification, spectrum analysis for passive detection and classification, and general linear transformations on data vectors. FFT processors are special purpose signal processing devices which perform linear and bilinear operations at rates in excess of the capabilities of large general purpose computers. Their applications include and are well suited for the spectral analysis of signals. Options for the implementation of FFT processors include both analog and digital means, their full potential being limited by the technical efficiency and economic availability of hardware. Digital means in particular offer outstanding practical implementations in many applications and have found use in such sophisticated signal processing tasks as bit synchronization, bit detection, error correction, coding, pulse compression, synthetic aperture processing, and other operations where fast transformations from the time to frequency domains and vice versa are needed. While the present disclosure has been made in terms of a time to frequency conversion it will be readily appreciated by those in the art that a frequency to time conversion can be performed equally well. In particular, the system of the present invention is expected to make dramatic reductions in the speed, complexity, and cost of unambiguously and accurately detecting signals and in the substantial reduction in the amount of computer power in applications involving radar, sonar, seismology, and the communications areas of television and radio.

Although a particular configuration of a digital FFT processor has been described, it should be understood that the scope of the invention should not be considered to be limited by way of illustration but by the appendant claims.

I claim:

1. In a system for the digital implementation of a fast Fourier transform (FFT), the combination of:
   a plurality of elements for performing FFT operations with each element including,
   first and secnd random access memories (RAMs) for storing signals,
   with said second memory connected to said first memory forming a delay line;
   a third memory for storing the rotation vector of said FFT;
   a multiplier having as inputs the outputs of said second memory and said third memory and providing at its output the product of said signal and said rotation vector;
   sum and difference circuits having as inputs the output of said first memory and said multiplier and providing at its output the sum and difference signals required for said element by the FFT algorithm;
   an address counter connected to said first, second, and third memories for accessing said memories; and
   a clock connected to said memories and to said address counter for controlling timing operations of said memories and of said address counter.

2. The system of claim 1 wherein said first and second memories are DELTIC RAMs.

3. The system of claim 1 wherein said third memory is a RAM.

4. The system of claim 1 wherein said elements for performing FFT operations are connected for serial.

5. The system of claim 1 wherein said third memory is a DELTIC circuit.

6. The system of claim 1 wherein said elements for performing FFT operations are connected for parallel operation.

7. The system of claim 1 wherein said elements for performing FFT operations are connected for array operation.

8. The system of claim 1 wherein said third memory is a ROM.

9. The system of claim 1 wherein said third memory is a PROM.

10. The system of claim 1 wherein said third memory is a shift register.

11. The system of claim 1 wherein said third memory includes means for generating a set of bipolar signals.

12. A method for the digital implementation of a fast Fourier transform (FFT), including th steps of:
    storing signals in first and second random access memories (RAMS);
    storing the rotation vector of said FFT in a third memory;
    multiplying the contents of said second and third memories in a multiplier;
    simultaneously adding and subtracting the contents of said first memory and the output of said multiplier to obtain $S_{sum}$, $S_{diff}$ as required by the FFT algorithm;
    accessing said memories with an address counter;
    timing the operation of said memories with a clock; and
    connecting a plurality of like units as described above for the computation of said FFT.

13. The method of claim 12 including the step of recirculating stored signals in a DELTIC RAM following their storage in said random access memories.

14. The method of claim 12 including the step of storing the rotation vector in a third memory as a RAM.

15. The method of claim 12 including the step of connecting the like units for serial operation.

16. The method of claim 12 including the step of connecting the like units for parallel operation.

17. The method of claim 12 including the step of connecting the like units for array operation.

18. The method of claim 12 including the step of storing the rotation vector in a ROM.

19. The method of claim 12 including the step of storing the rotation vector in a PROM.

20. The method of claim 12 including the step of storing the rotation vector in a shift register.

21. The method of claim 12 including the step of storing the rotation vector in means generating a set of bipolar signals.

22. The method of claim 12 including the step of storing the rotation vector in a DELTIC circuit.

* * * * *

UNITED STATES PATENT AND TRADEMARK OFFICE
CERTIFICATE OF CORRECTION

PATENT NO. : 3,965,342
DATED : June 22, 1976
INVENTOR(S) : James Nickolas Constant It is certified that error appears in the above–identified patent and that said Letters Patent are hereby corrected as shown below:

Column 4, line 8 and Fig. 2, change "$2^N$" to --$\log_2 N$--

Column 5, line 57, change "$2^{N/2}$" to --$\log_2 N/2$--

Column 4, line 36, read "Electronic"

58, read "AS"

66, read "RAMs"

Column 7, line 5, read "update"

Column 8, line 14, read "signal"

line 56, delete "In many applications"

Column 9, line 35, read "second"

Column 10, line 2, add --operation-- after "serial"

Signed and Sealed this

Ninth Day of November 1976

[SEAL]

Attest:

RUTH C. MASON
*Attesting Officer*

C. MARSHALL DANN
*Commissioner of Patents and Trademarks*